United States Patent
Oshins et al.

(10) Patent No.: US 7,366,944 B2
(45) Date of Patent: Apr. 29, 2008

(54) INCREASING SOFTWARE FAULT TOLERANCE BY EMPLOYING SURPRISE-REMOVAL PATHS

(75) Inventors: Jacob Oshins, Seattle, WA (US); Doron J. Holan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 11/036,803

(22) Filed: Jan. 14, 2005

(65) Prior Publication Data

US 2006/0161821 A1    Jul. 20, 2006

(51) Int. Cl.
*G06F 11/00* (2006.01)
(52) U.S. Cl. .................. 714/2; 714/33; 714/38
(58) Field of Classification Search ............ 714/52, 714/763, 2, 15, 16, 33, 38; 711/161; 717/135
See application file for complete search history.

(56) References Cited

U.S. PATENT DOCUMENTS

| | | | |
|---|---|---|---|
| 6,189,050 B1 * | 2/2001 | Sakarda | 710/18 |
| 6,243,774 B1 | 6/2001 | Eide et al. | |
| 6,332,200 B1 | 12/2001 | Meth et al. | |
| 6,658,489 B1 | 12/2003 | Asselin | |
| 6,725,262 B1 | 4/2004 | Choquier et al. | |
| 6,728,833 B2 | 4/2004 | Pruett et al. | |
| 6,883,114 B2 | 4/2005 | Lasser | |
| 6,883,171 B1 | 4/2005 | Garcia | |
| 6,968,307 B1 * | 11/2005 | Chrysanthakopoulos | 703/27 |
| 7,131,031 B2 * | 10/2006 | Brundridge et al. | 714/25 |
| 2004/0123188 A1 * | 6/2004 | Srinivasan et al. | 714/44 |

OTHER PUBLICATIONS

L. Murray et al., An Approach to Specifying Software Frameworks. Proceedings of the 27th Conference on Australasian Computer Science vol. 26, pp. 185-192, 2004.
S. Wang et al., Synthesizing Operating System Based Device Drivers in Embedded Systems. Proceedings of the 1st IEEE/ACM/IFIP International Conference on Hardware/Software Codesign and System Synthesis, pp. 37-44, 2003.
Christopher L. Conway, et al., NDL: A Domain-Specific Language for Device Drivers, LCTES'04, Jun. 11-13, 2004, 7 pages.

* cited by examiner

*Primary Examiner*—Dieu-Minh Le
(74) *Attorney, Agent, or Firm*—Amin, Turocy & Calvin, LLP

(57) ABSTRACT

The subject invention relates to systems and methods for automatic recovery from errors in a computing environment. A system is provided to facilitate failure recovery in the computing system. The system includes at least one driver component that enumerates at least one layer of a driver stack. A module associated with the driver component requests re-enumeration of the driver stack upon detection of an error in the computing system. When an error is detected by a driver or operating system component, a protocol can be established whereby a new copy of the driver's stack or system resources is re-enumerated in parallel to existing resources that may be in an unknown or error state. The new copy of the stack may allow the driver to become operational in lieu of the previous stack which can be reclaimed for other system uses over time.

19 Claims, 9 Drawing Sheets

INCREASING SOFTWARE FAULT TOLERANCE BY EMPLOYING SURPRISE-REMOVAL PATHS

TECHNICAL FIELD

The subject invention relates generally to computer systems, and more particularly, the subject invention relates to a system that enables components to recover from soft failure situations by simulating hardware removal conditions.

BACKGROUND OF THE INVENTION

In some operating systems, "drivers" are software modules that can be inserted into an operating system kernel, allowing for support of specific hardware or for extension of the operating system or both. Generally, drivers run in a fully trusted mode, whereby any failure in these components can cause machine services to fail, or a full system crash. Thus, any successful effort to make drivers more resilient or fault tolerant usually causes greater system reliability and consequently customer satisfaction to increase.

One of the barriers to greater driver resilience is that a driver typically has to respond to many "events" generated by the operating system which may require the driver to initiate operations which can fail. For example, these events may be file handle creation, device insertion, power being turned off, statistics gathering, and so forth. Most of the time, the exact action that a driver should take in response to an internal failure is poorly defined. This is partly due to the operating system not always being designed to handle every conceivable set of failures, partly due to external documentation not covering every situation and partly due to certain failures that involve a large amount of judgment on the part of the driver designer. Furthermore, drivers are often constructed internally as large "state machines" wherein a response to an event will depend largely on which events have occurred in the past. After a failure occurs, the driver designer often has to immediately turn around and handle new events, even though the failure probably implies that new events are likely to fail as well.

Currently, there is no efficient manner within some operating systems to easily cause a driver to reset its internal state. This implies that the driver's internal state machine should be designed to process failure events at every moment possible. This vastly increases the complexity of the driver, often doubling or tripling it in size in terms of the amount of code necessary to support such failure events. This increase in size also implies an exponential growth in the amount of time necessary to test and debug the driver, as most of the code paths within it may never be executed unless there is some failure in the operating system, the hardware or the driver itself. Since failures are not the normal case, mistakes in error handling code paths often go undetected.

Driver designers may cope with failure events in one of several ways. This may include:

1) They ignore some or all errors. This leads to, for instance, machines that crash as soon as some application requests all of memory.

2) They attempt to request as much of the resources that they will possibly need (e.g., memory, registry handles, and so forth) at start up time, minimizing the number of possible failure paths at run time. This may lead to wasted memory, and other frustrating situations, such as the need to reboot a machine to upgrade a driver.

3) They spend years "hardening" their drivers, handling every error path. Today, this is generally only performed by designers who are trying to run operating systems in data center environments, as they are typically the only ones who can afford the cost of such hardening.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods for enabling drivers or other software components to automatically recover from failure in a reliable and predictable manner. This includes providing methods and/or components for allowing a driver to "reset" its internal state by abandoning a running copy of its current state and creating a new instance of the driver from the beginning. This can allow a driver to skip handling of many common error cases, enabling a more general reset mechanism to process errors at a higher level, and decreasing the internal complexity of the driver and/or increasing the driver's resilience to continue normal operations. In one aspect an interface or message protocol is provided whereby a functional device object (FDO) or other driver layered on top of a physical device object (PDO) in a component stack can send a request down a device stack requesting the driver to simulate a series of physical unplug and re-plug events (e.g., simulate a hardware module being plugged/unplugged). When the request reaches the PDO, the receiving driver informs an operating system component that the device has disappeared or is no longer operational. A subsequent operating stack is then enumerated in parallel with the previous stack that encountered the error in order to attempt to resume normal operations of the driver. Other protocols can be provided to remove older stack resources over time.

The above described messaging protocol can include many different aspects to attempt to revive a component from failure. These can include a device or component driver which enumerates other drivers along with a module, possibly within the same driver, which can request that it be re-enumerated when a failure occurs. The module that requests re-enumeration can reside inside a functional driver, a bus driver, or filter, for example, where the request to re-enumerate is eventually processed by the lowest-level driver in a stack. The request to re-enumerate can also be handled by the driver by informing a bus manager that the device is missing, and then later informing it that the device is present again. Generally, after re-enumeration, the drivers in the stack abandon old, error-related state when an error occurs and create new or reset software-related state when the device is re-enumerated. In another aspect, the drivers can reset hardware states after a new software state has been created, possibly recovering from a hardware error.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods for automatic recovery from errors in a computing system. In one aspect, a system is provided to facilitate failure recovery in the computing environment. The system includes at least one driver component that enumerates at least one layer of a driver stack. A module (e.g., bus or system manager) associated with the driver component receives requests for re-enumeration of the driver stack upon detection of an error in the computing system. Thus, if an error is detected by a driver or operating system component, a protocol can be established whereby a new copy of the driver's stack or system resources is created (re-enumerated) in parallel to existing resources that may be in an unknown or error state. The new copy of the stack may allow the driver to become operational in lieu of the previous stack which can be reclaimed for other system uses over time. The protocol has the effect of simulating a plug and unplug hardware event which causes the stack to be re-enumerated and to reset driver states in order to facilitate recovery from various failure events.

As used in this application, the terms "component," "driver," "system," "object," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
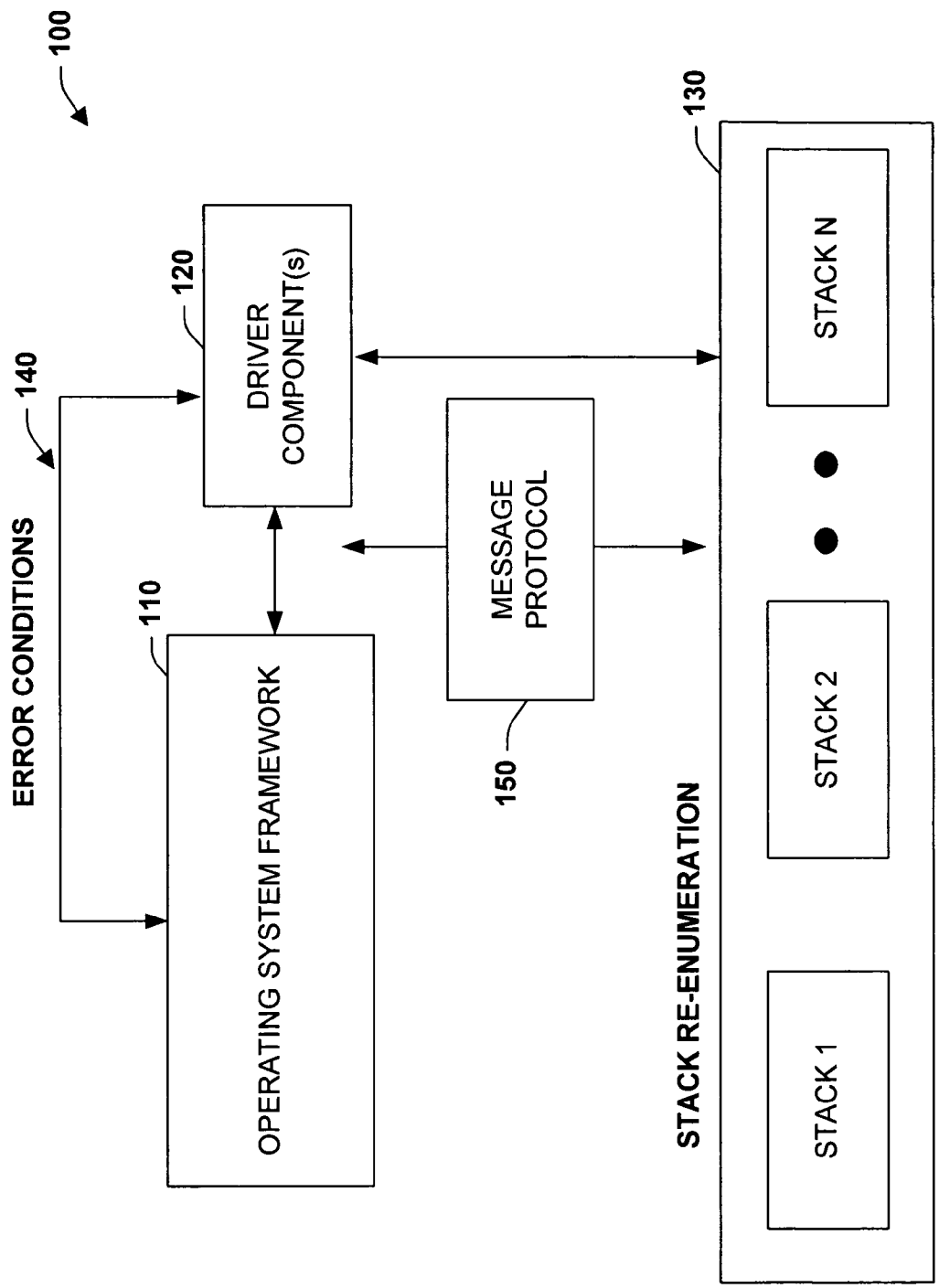
FIG. 1 is a schematic block diagram illustrating an error recovery system in accordance with an aspect of the subject invention.

Referring initially to FIG. 1, an error recovery system 100 is illustrated in accordance with an aspect of the subject invention. The system 100 includes an operating system framework 110 (or framework) that interacts with one or more driver components 120 (also referred to as drivers) to facilitate operations with hardware and/or software components of a computing system. During normal operations (e.g., non-failure states), the driver 120 generally instantiates a stack of objects that facilitate interactions with the driver and the framework 110. For instance, a $Stack_1$ may be created at 130 providing interface components such as I/O Request Packet (IRPs) handlers that process I/O events from the framework 110. Stack operations 130 are described in more detail below with respect to FIG. 2. It is noted that the drivers can control hardware peripherals such as a keyboard, mouse, memory, disk drive, network ports and so forth and/or can control software components/drivers that can be partitioned, combined, or replicated into various functional elements.

During an error condition 140 detected by the framework 110 and/or the driver 120, a message protocol 150 can be established that causes the driver to re-enumerate or recreate one or more stacks 130 in order to reset internal state mechanisms and to facilitate recovery from the condition 140. This allows for bootstrapping of the stacks 130 in a controlled manner whereby the internal state of the re-enumerated stack is reset. In many cases this can overcome permanent or temporary error conditions 140 that may cause conventional drivers 120 to lock up. For example, the driver 120 may indicate to the framework 110 that an error has occurred. The framework 110 can then via the message protocol 150 initiate a surprise removal sequence which simulates in software the conditions of a module being removed from the system 100. The simulation causes the driver 120 to then create a subsequent stack 130 such as $Stack_2$ from which to operate. If other errors are detected, subsequent stacks 130 can be created. Over time, previously created stacks 130 can be removed as is described in more detail below.

Generally, the drivers 120 can optionally support the concept of "Surprise Removal." This allows the driver 120 to be notified that a device or component that it is driving/controlling has been physically removed from the system without notice. Typically, all operations that are in progress should cease such as data transfers, handling or I/O request packets and so forth. The framework 110 has standard infrastructure for negotiating with applications to cause release of any resources that are blocking the orderly disposal of the software state associated with a device or component instance. When that negotiation is complete, old device objects can be deleted along with related state information.

Drivers which currently support Surprise Removal already have, built in, one mechanism for resetting all of their internal state, insomuch as physically removing a device out of a system and reinserting it causes the current software state to be torn down and then rebuilt. In some conventional operating systems, it is only possible to trigger a Surprise Removal by removing a physical object out of a machine or out of a port on the side of the machine. The subject invention provides the message protocol 150 to trigger the same sequence of software events that would happen if a device were removed and reinserted. When this sequence is triggered, the existing driver software state is abandoned and new state is created via the stacks 130. If the negotiation with associated applications is successful, the old abandoned state can be torn down and disposed of (e.g., memory space reclaimed for other uses).

Figure 2:
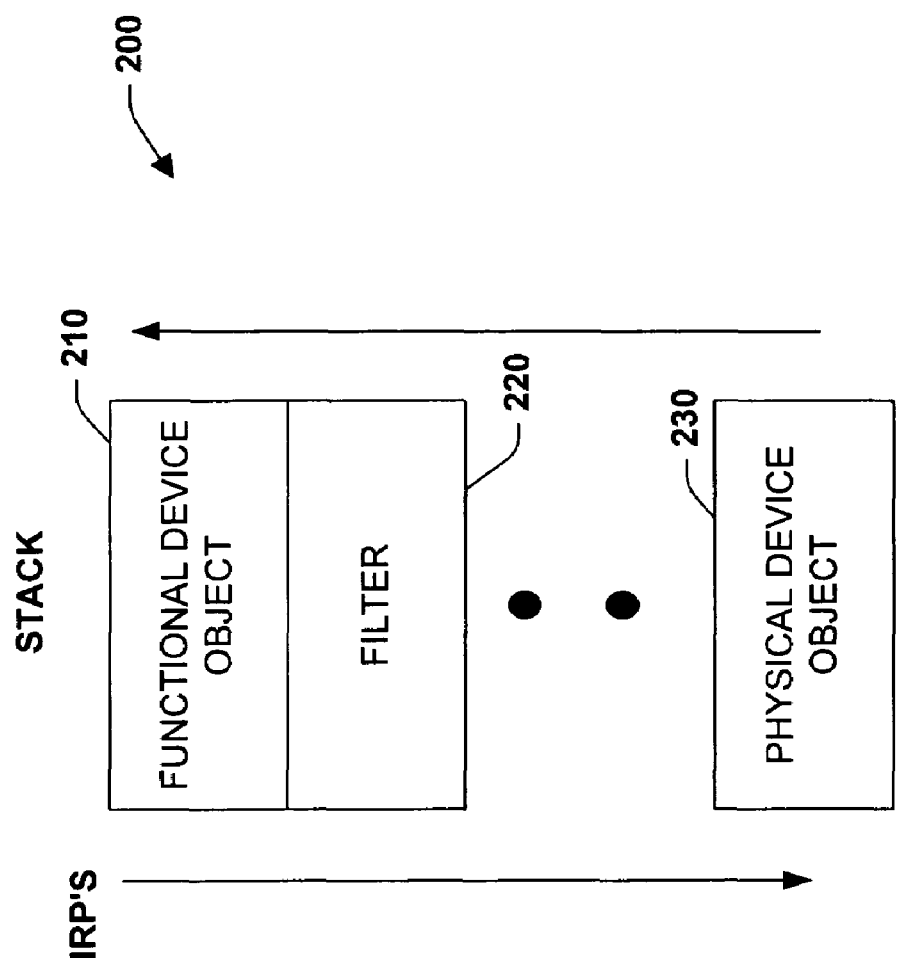
FIG. 2 is a block diagram illustrating an exemplary stack in accordance with an aspect of the subject invention.

Referring now to FIG. 2, an exemplary stack 200 is illustrated in accordance with an aspect of the subject invention. The stack 200 can include one or more stack objects. For example, the objects can include a Functional Device Object (FDO) 210, a filter object 220 supplied by an operating system framework, and a Physical Device Object (PDO) 230. As illustrated, I/O Request packets (IRP's) can be propagated up or down the stack 200 for respective processing, wherein framework components or drivers can be driven and/or synchronized from a respective IRP.

It is noted that some operating systems or frameworks support the concept of driver stacking. For example, when an application opens up a handle to a "device," it controls the device by sending I/O Request Packets to the stack of drivers at 200. Generally, each of those drivers in the stack 200 may react to, modify or otherwise handle the IRPs that it observes. When one driver is finished with an IRP, it usually passes the IRP down to the driver below it. There is also an opportunity for a driver to process an IRP after the driver below it has completed it. These type of stack actions are relevant since each physical device or component may have several drivers acting on it in some manner.

Generally, surprise removal functionality relates to how drivers are structured, wherein drivers are built in "stacks," 200 with defined methods of passing requests (called I/O Request Packets, or IRPs) down and then back up the stacks. This allows for modular extension of existing function, along with segmenting control of a device or component into multiple modules. When devices are connected to a machine, it is usually through physical or logical connector, often one that is called a "bus." In software, the connector and the circuitry behind it is modeled by a "bus driver." The bus driver is generally responsible for determining what is plugged into the connector. When something is plugged in, the driver creates the Physical Device Object (or PDO) 230 which represents the new device. The PDO 230 becomes the bottom of a new device stack. A Plug and Play manager (or other component in the framework kernel) sends IRPs to the new PDO 230 to retrieve information about the PDO, including which drivers should be loaded on top of it to provide device-specific function. A driver which sits atop a PDO and provides specific functionality is the Functional Device Object (or FDO) 210. A device stack generally will consist of at least these two objects.

In order to re-use the code paths that already exist to process Surprise Removal conditions, an interface is provided whereby the FDO 210 (or any other driver layered on top of a PDO) can send a request down the device stack requesting the bus driver to simulate a series of physical unplug and re-plug events. When the request reaches the PDO 230, the bus driver notifies the framework (e.g., Plug and Play manager) that the device has been removed. A subsequent operating stack is then re-enumerated as is described in more detail below.

Figure 3:
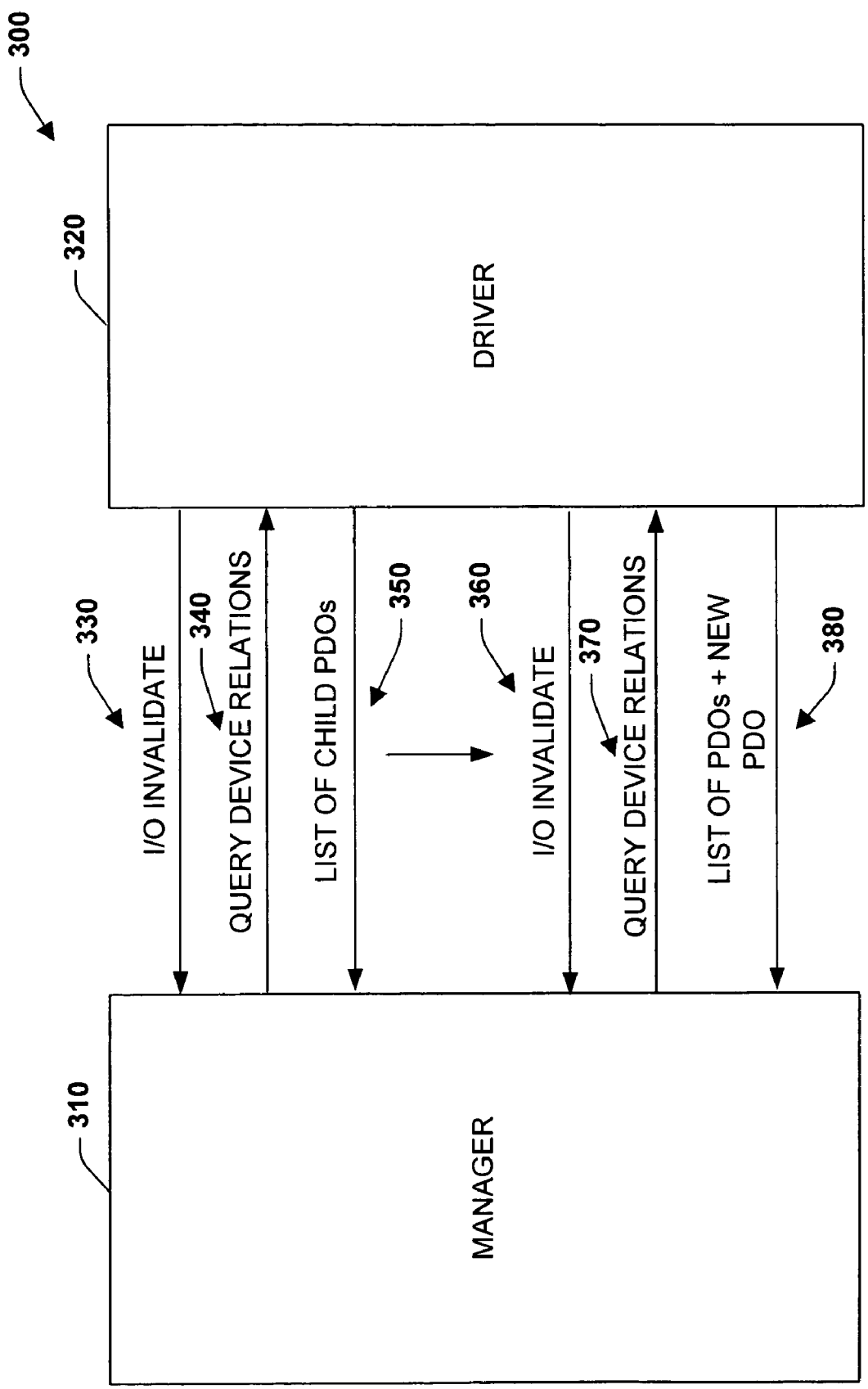
FIG. 3 illustrates an example simulation sequence in accordance with an aspect of the subject invention.

FIG. 3 illustrates an example simulation sequence in accordance with an aspect of the subject invention. In this example, an operating system manager 310 communicates a simulated surprise removal event with a driver 320, wherein the following example protocol is employed to cause the driver to re-enumerate an instance of the driver to facilitate error recovery. In one operating system example, this can be achieved by calling a function IoInvalidateDeviceRelations at 330. The manager 310 (e.g., Plug and Play Manager) sends IRP_MN_QUERY_DEVICE_RELATIONS at 340. The driver 320 then responds with a list of "child" PDOs at 350 which does not include the PDO that sits below the failed driver 320. The manager 310 then interprets the response at 350 as a physical removal of a device. The driver 320 then calls IoInvalidateDeviceRelations again at 360, causing another IRP_MN_QUERY_DEVICE_RELATIONS at 370 to be sent to the driver.

The driver 320 returns a list of PDOs at 380 that includes the child PDOs in the previous list at 350, plus a new PDO—created to represent the device anew. The manager 310 responds to this new, unknown PDO at 380 by sending the IRPs it would to a brand new device, gradually discovering which drivers should be layered on top of it. It should discover the same drivers that were atop the old PDO. As those get loaded, a new state will be created for each PDO, allowing device operation (or a general kernel extension) to re-start cleanly. In a similar manner, failures in PDO-related code of the driver 320 can also be handled by sending a similar sort of request internally from one part of the driver to another.

Figure 4:
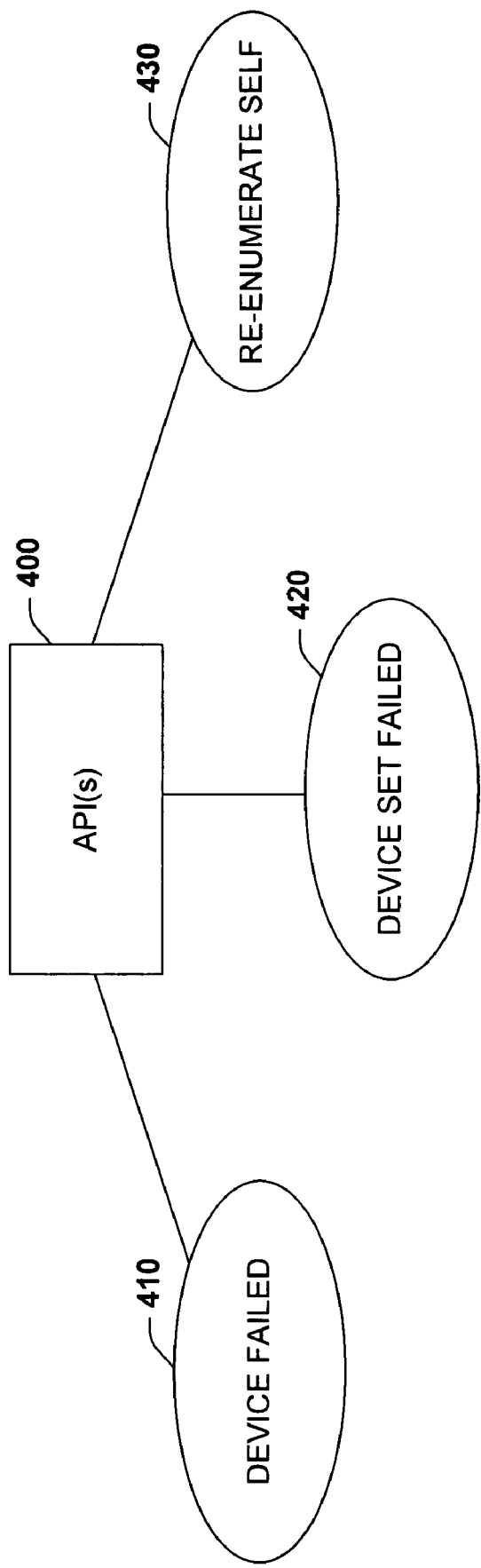
FIG. 4 illustrates example system application programming interface aspects in accordance with an aspect of the subject invention.

FIG. 4 illustrates example system application programming interface (API) aspects 400 in accordance with an aspect of the subject invention. Some of the APIs that can be employed include a device failed API at 410, a device set failed API at 420, and a re-enumerate self API at 430. Specific examples of the APIs 400 are described as follows:

```
typedef enum _WDF_DEVICE_FAILED_ACTION {
    WdfDeviceFailedUndefined = 0,
    WdfDeviceFailedAttemptRestart,
    WdfDeviceFailedNoRestart,
} WDF_DEVICE_FAILED_ACTION;
WDFAPI
VOID
WdfDeviceSetFailed(
    IN WDFDEVICE Device,
    IN WDF_DEVICE_FAILED_ACTION FailedAction
    );
```

When the above API is called, a request is sent to the PDO by making a direct call through an interface obtained by sending IRP_MN_QUERY_INTERFACE. This interface is defined as follows:

```
DEFINE_GUID(
GUID_REENUMERATE_SELF_INTERFACE_STANDARD,
0x2aeb0243, 0x6a6e, 0x486b, 0x82, 0xfc, 0xd8, 0x15, 0xf6, 0xb9, 0x70,
0x06 );
typedef
VOID
(*PREENUMERATE_SELF)(
    IN PVOID Context
    );
typedef struct _REENUMERATE_SELF_INTERFACE_STANDARD {
    //
    // generic interface header
    //
    USHORT Size;
    USHORT Version;
    PVOID Context;
    PINTERFACE_REFERENCE InterfaceReference;
    PINTERFACE_DEREFERENCE InterfaceDereference;
    //
    // Self-reenumeration interface
    //
    PREENUMERATE_SELF SurpriseRemoveAndReenumerateSelf;
} REENUMERATE_SELF_INTERFACE_STANDARD,
*PREENUMERATE_SELF_INTERFACE_STANDARD;
```

For the above mechanism to succeed, the failing driver and the bus driver (which may be the same) should support the interface. If they do, then no further changes are necessary from the Kernel's PnP manager. It is noted that by keeping the interface functionality in the drivers, older versions of the operating system do not have to be upgraded to support such functionality. An alternative implementation, however, could put some of the interface functionality into the PnP manager. It is also noted that the interface approach outlined above may also allow a device to continue operating after experiencing hardware-related failures.

Figure 5:
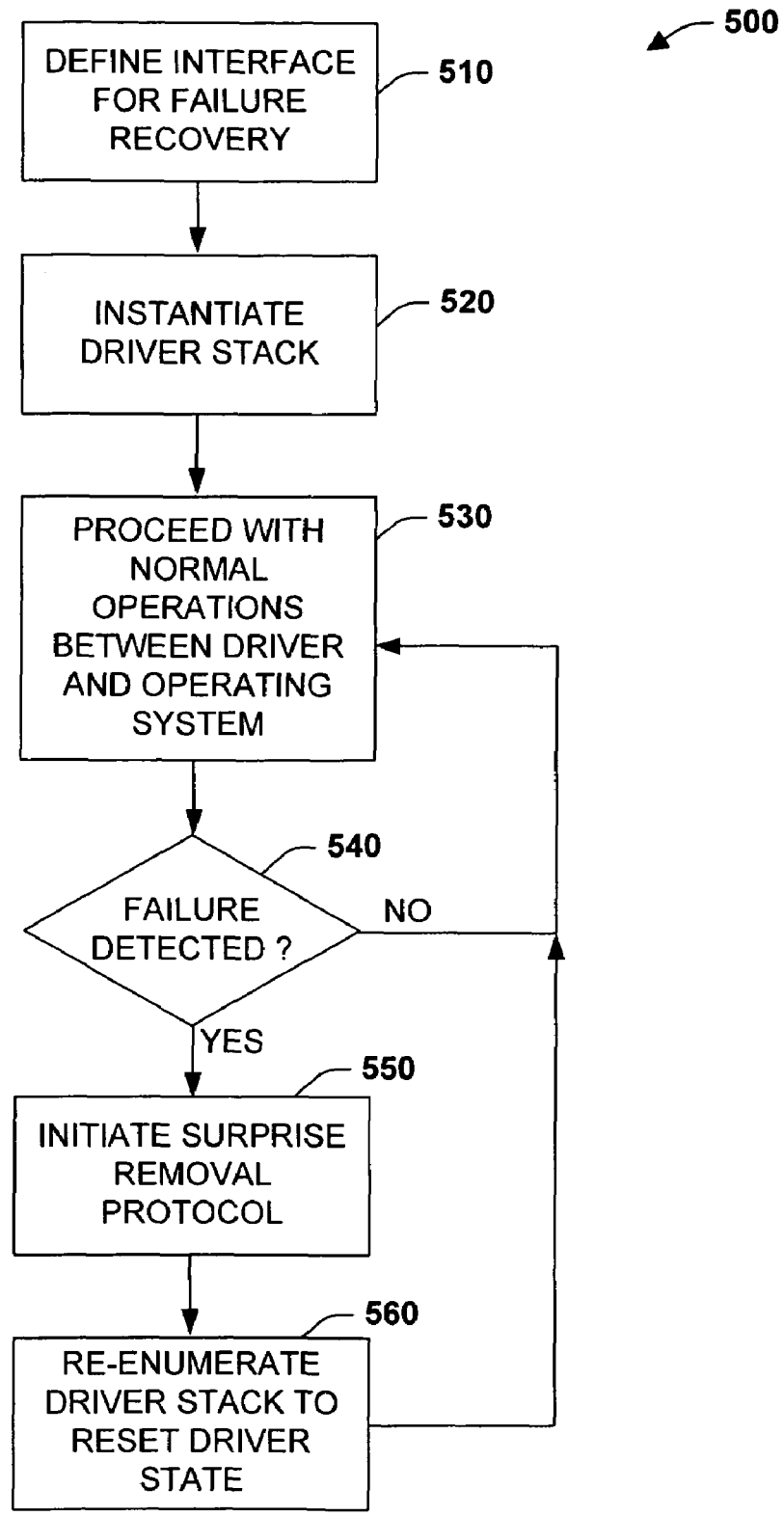
FIGS. 5 and 6 illustrate example error recovery processes in accordance with an aspect of the subject invention.
Figure 6:
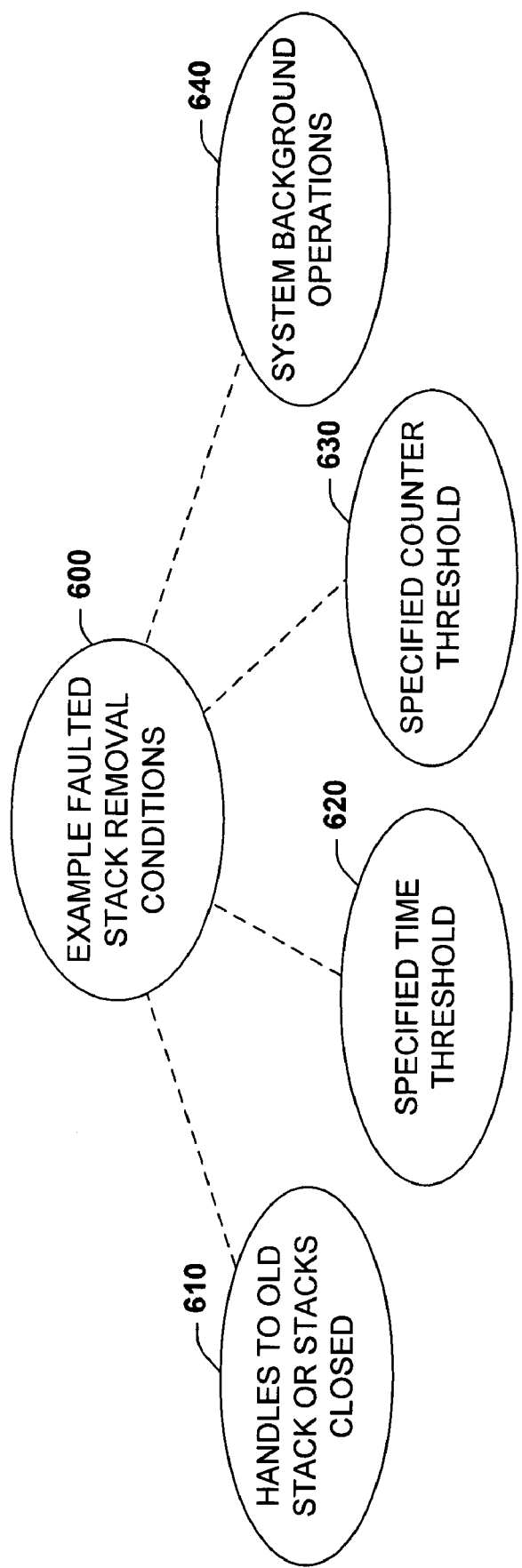

FIGS. 5 and 6 illustrate example error recovery processes in accordance with an aspect of the subject invention. While, for purposes of simplicity of explanation, the methodologies are shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 5 illustrates a methodology for failure recovery in a computing environment. Proceeding to 510, one or more interfaces are defined that allow drivers and/or operating system components to simulate system module removal via software events in order to reset or reinitialize operating states of the drivers. As noted above, this may include defining one or more application programming interfaces to facilitate such simulation. At 520, an initial driver stack is instantiated by the operating system to enable normal operations with a device or component within a computing system. At 530, after the stack is instantiated, normal operations of the system proceed between the operating system, framework, manager, and/or driver via the driver stack.

At 540, a determination is made as to whether or not a failure has been detected with respect to a given driver. If not, the process proceeds back to 530 to continue normal system operations. If a failure has been detected at 540, the process proceeds to 550 where a surprise removal procedure is invoked by initiating a message protocol between the operating system and driver (or visa versa) that simulates a device's removal from the computing system. This exchange of protocol causes a re-enumeration of the driver and associated stack at 560 which results in a new driver state to be initialized that facilitates recovery from faults such as a non-responsive or inordinately slow responding driver. After the re-enumeration at 560, the process proceeds back to 530 to continue normal operations. As will be described in more with respect to FIG. 6, various processes can be employed to reclaim resources that were previously allocated for non-functioning driver stack or stacks that are no longer operational due to the protocol initiated at 550.

Proceeding to FIG. 6, various example stack removal conditions 600 for non-functioning or previously allocated stacks are described. As noted above, when an error condition is detected, the subject invention can initiate re-enumeration of a component stack to in effect simulate an actual module removal and thus facilitate resetting states within a new version of the stack in order to attempt to recover from a fault condition or conditions. When a new stack has been re-enumerated or created in parallel/other memory to an older version of the stack, old stacks associated with previous fault conditions can be removed or reclaimed according to various techniques.

In one aspect, proceeding to 610, if an operating system or framework detects that all or a predetermined subset of handles to previously used or old stacks are closed, interfaces or routines that may possibly access the old stacks can be terminated and the memory employed for the old stack can be reclaimed by the system and allocated for other uses. At 620, old stack space can be reclaimed based upon a predetermined time threshold (e.g., after 5 minutes of initiating a re-enumeration, remove old stack and calls thereto from system). At 630, stack cleanup can occur after a predetermined count. For example, an algorithm could run that says any time re-enumeration of a driver has exceeded a predetermined count threshold, then remove or reclaim all or a predetermined number of previous driver stacks. At 640, stack cleanup and removal can occur as part of normal system background (or foreground) operations, for example. For instance, in a managed object system, object memory can be reclaimed by a garbage collector that automatically removes unused objects from memory or the system. It is noted that another condition for the employment of timers and/or counters is to facilitate that the same error condition is not encountered repeatedly. This could cause a new stack (or stacks) to be re-enumerated for a similar problem encountered by the old stack and thereby cause excessive resources such as memory to be used.

Figure 7:
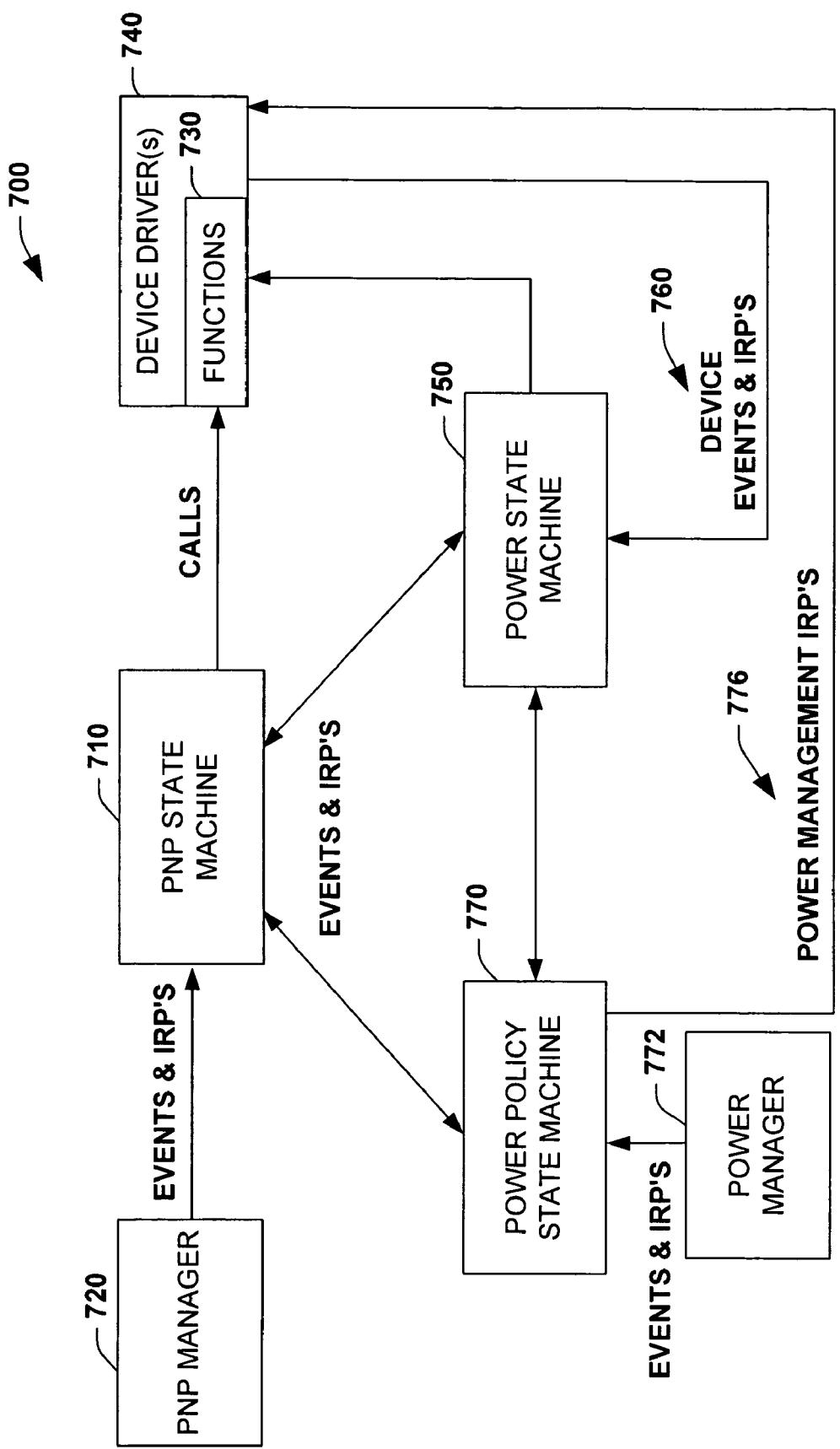
FIG. 7 illustrates an example state machine system for driver interactions in accordance with an aspect of the subject invention.

FIG. 7 illustrates an example state machine system 700 for driver interactions in accordance with an aspect of the subject invention. The system 700 is provided for an example context of how drivers or framework components adapted in accordance with the subject invention can interact with other components in a computing environment. Although three state machines are illustrated in the system 700, more or less than three can be employed. A first state machine, referred to as the PnP State Machine 710, tracks PnP events or I/O Request Packets (IRPs) from a Plug and Play (PnP) manager 720. This machine responds by feeding events into other state machines and by calling PnP-related functions 730 supplied by a device or component driver 740, which fill in driver-specific behavior (e.g., create driver functional stacks which define overall driver behavior). A second state machine, referred to as the Power State Machine 750, tracks device Power Management events or IRPs at 760. This machine also manages device power states, by calling driver-supplied functions 730 where necessary.

A third state machine, referred to as the Power Policy State Machine 770, tracks system Power Management events or IRPs supplied by a system Power Manager 772. In one aspect, the Power Policy State Machine 770 manages tracking overall system state, along with device usage, deciding what power state the device should be in. The Power Policy Machine 770 sends device Power management IRPs at 776 that can become input events 760 for the Power State Machine 750. Generally, each of these state machines 710, 750, and 770 generate some events that are consumed by the other machines or other components. Together, they make up a larger system for implementing PnP and Power in the device driver 740 (or drivers). When the machines are integrated into a Driver Framework or operating system layer, they can be employed by a plurality of different device drivers, solving many problems such as system power consumption, driver complexity, error handling, and system robustness.

Generally the state machines support a system that implements a general mechanism for PnP, Device Power and/or Device Power Policy events. The system 700 includes entry into states in one state machine that can cause transitions to occur in other state machines or components. In one example, entry into one state causes a Power Up event to be sent to the other state machines since these machines may have been sent events that caused the device to start being used. This would result in an "Implicit" event sent to the Power state machine which unifies the PnP and Power machines. In a multiprocessing operating system, components generally do not wait by sitting in a loop with the processor-these components suspend operations. Thus, the "Power Up" event alerts the PnP state machine and causes it to start running again, finishing the PnP operation. Specific state processing implementation examples include, entry into a lower power state in the Power state machine causes a Power Down event to be fed into the Power Policy and the PnP state machines.

Figure 8:
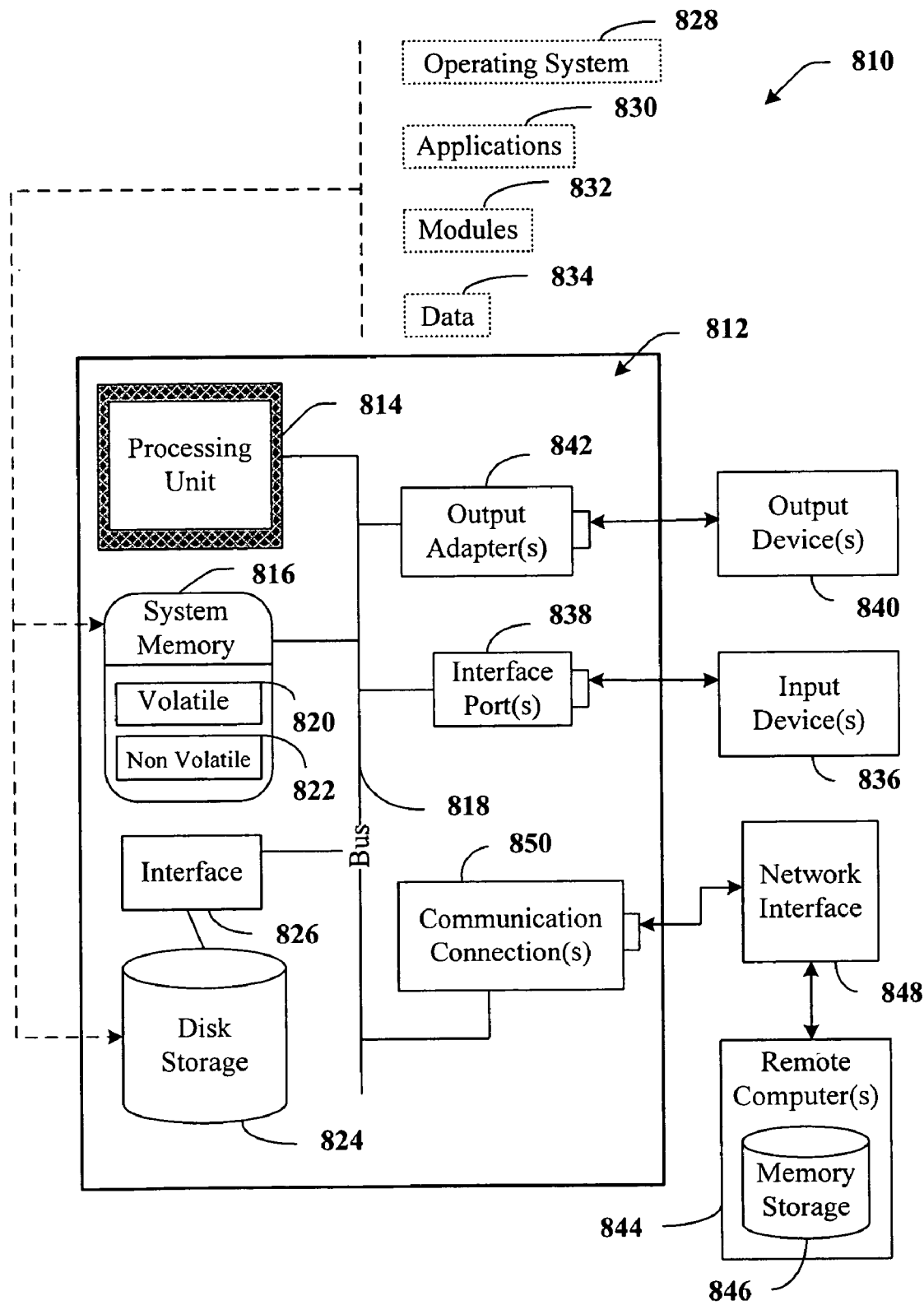
FIG. 8 is a schematic block diagram illustrating a suitable operating environment in accordance with an aspect of the subject invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
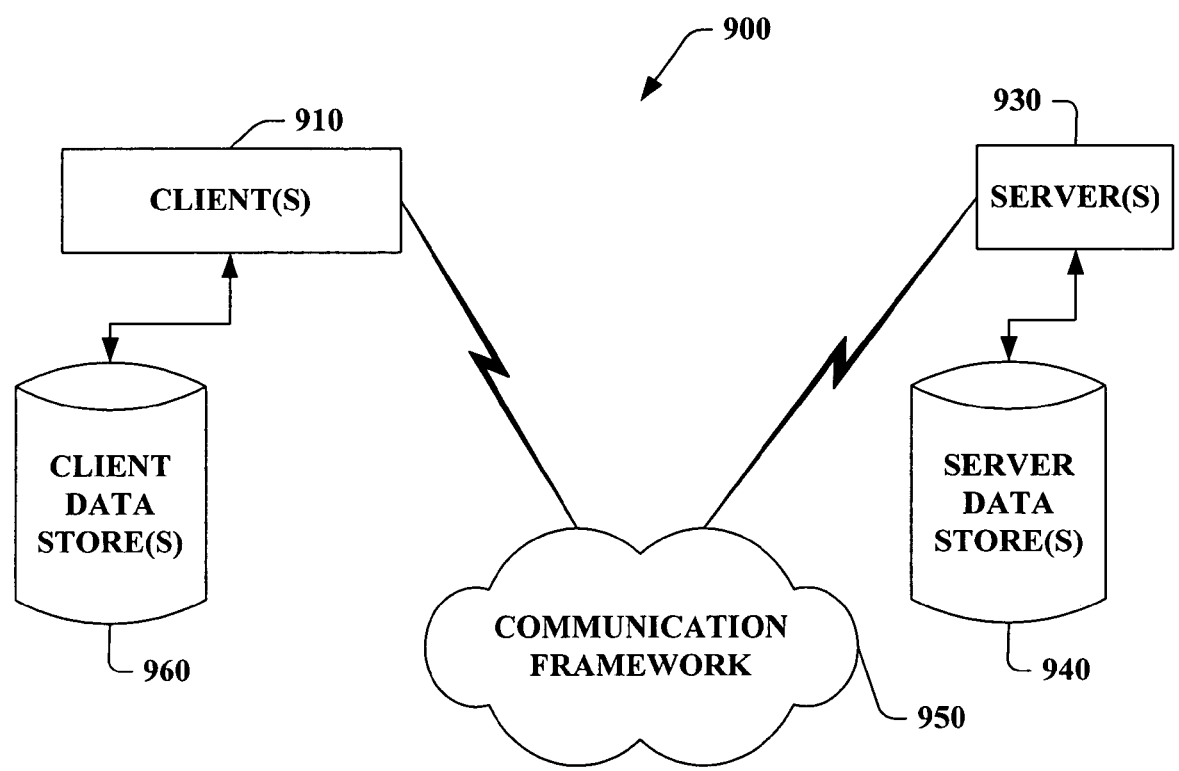
FIG. 9 is a schematic block diagram of a sample-computing environment with which the subject invention can interact.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the subject invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system to facilitate failure recovery in a computing environment, comprising:
   a computer processor that executes the following software components:
   at least one driver component that enumerates at least one layer of a driver stack;
   a module associated with the driver component that facilitates re-enumeration of the driver stack upon detection of an error in the computing system;
   an operating system framework that interacts with the at least one driver component to facilitate operations with hardware and software components of the computing system;
   the framework, via a message protocol, initiates a surprise removal sequence which simulates in software the conditions of the module being removed from the computing system, the simulation causes the at least one driver component to create a subsequent driver stack from which to operate; and
   the subsequent driver stack is created in parallel with the previous stack that encountered the error in order to attempt to resume normal operations of the at least one driver component.

2. The system of claim 1, the module requests re-enumeration inside a driver layered on top of a device object that was enumerated by the at least one driver component.

3. The system of claim 2, the requests for re-enumeration is transmitted from an upper-level driver to a lower-level driver.

4. The system of claim 2, the requests for re-enumeration is responded to by the at least one driver by a signal that indicates a device is absent.

5. The system of claim 2, further comprising a component to cause drivers in a stack of drivers to create different software states after a re-enumeration sequence.

6. The system of claim 1, further comprising one or more application programming interfaces (APIs) to facilitate the re-enumeration.

7. The system of claim 6, the APIs are associated with a device failed functionality, a device set failed functionality, or a re-enumeration functionality.

8. The system of claim 6, further comprising a message protocol that is associated with an I/O invalidate function, a query device relations function, or a list device object function.

9. The system of claim 1, further comprising a component to reclaim unused resources after the re-enumeration.

10. The system of claim 1, further comprising a component to facilitate negotiations between an operating system, an application, or a driver in accordance with the re-enumeration.

11. The system of claim 1, the stack includes at least one of a Functional Device Object (FDO), a filter object, and a Physical Device Object (PDO).

12. The system of claim 1, the module and the at least one driver share interface functions to facilitate the re-enumeration.

13. A system for detecting and correcting errors in a computer, the system is recorded on a computer storage medium and executed by a processor, comprising:
    means for creating a driver stack;
    means for interfacing to the stack;
    means for detecting errors with the stack;
    means for re-creating a new stack upon detecting the errors; and
    means for initiating a surprise removal sequence which simulates in software the conditions of a module being removed from a computing system, the simulation causes the re-creation of the new stack from which to operate.

14. A method for failure recovery in computer systems, comprising:
    creating an instance of a stack to enable driver functionality;
    detecting a fault with the driver functionality;
    automatically negotiating with a framework component when detecting the fault;
    automatically creating a new instance of the stack after detecting the fault in order to facilitate recovery of the driver functionality;
    initiating, via a message protocol, a surprise removal sequence which simulates in software the conditions of a module being removed from a computing system, the simulation causes the creation of the new instance of the stack from which to operate; and
    creating the new instance of the stack in parallel with the previous instance of the stack that encountered an error in order to attempt to resume normal operations of the driver functionality.

15. The method of claim 14, further comprising automatically removing previous instances of the stack.

16. The method of claim 14, further comprising initiating a message protocol between at least two components after detecting the fault.

17. The method of claim 16, the message protocol employs software commands to simulate a hardware event.

18. The method of claim 17, the message protocol is associated with a listing of device objects.

19. The method of claim 16, the message protocol is associated with an application programming interface (API), the API is associated with at least one of a device failed function, a device set failed function, and a re-enumerate function.

* * * * *